United States Patent [19]

Lowenhaupt, III et al.

[11] 3,794,719

[45] Feb. 26, 1974

[54] REDUCTION OF NICKEL CONTAMINATION BY ZINC IN α-HYDROXY OXIME EXTRACT

[75] Inventors: Edward Harris Lowenhaupt, III; Edward Edmunds, Jr.; Richard Dean Eliasen, all of El Paso, Tex.

[73] Assignee: S.E.C. Corporation, El Paso, Tex.

[22] Filed: Feb. 25, 1972

[21] Appl. No.: 229,328

[52] U.S. Cl. ............... 423/139, 423/100, 260/566, 75/119, 75/120
[51] Int. Cl. ..... B01d 11/04, C01g 53/00, C01g 9/00
[58] Field of Search ........... 23/312 R, 312 ME, 309; 423/100, 139; 75/119, 120; 260/566

[56] References Cited
UNITED STATES PATENTS 3,276,863 10/1966 Drobnick ............................ 75/119
3,399,055 8/1968 Ritcey ................................. 423/139
3,088,799 5/1963 Fetscher ............................. 23/312 R
3,682,589 8/1972 Moore ................................ 23/312 R
3,479,378 11/1969 Orlandine ............................ 75/119

*Primary Examiner*—Norman Yudkoff
*Assistant Examiner*—S. J. Emery
*Attorney, Agent, or Firm*—Neuman, Williams, Anderson & Olson

[57] ABSTRACT

The amount of zinc coextracted with nickel by α-hydroxy oxime extractants is reduced by contacting said extractants with an excess of nickel ions to selectively displace zinc.

3 Claims, 1 Drawing Figure

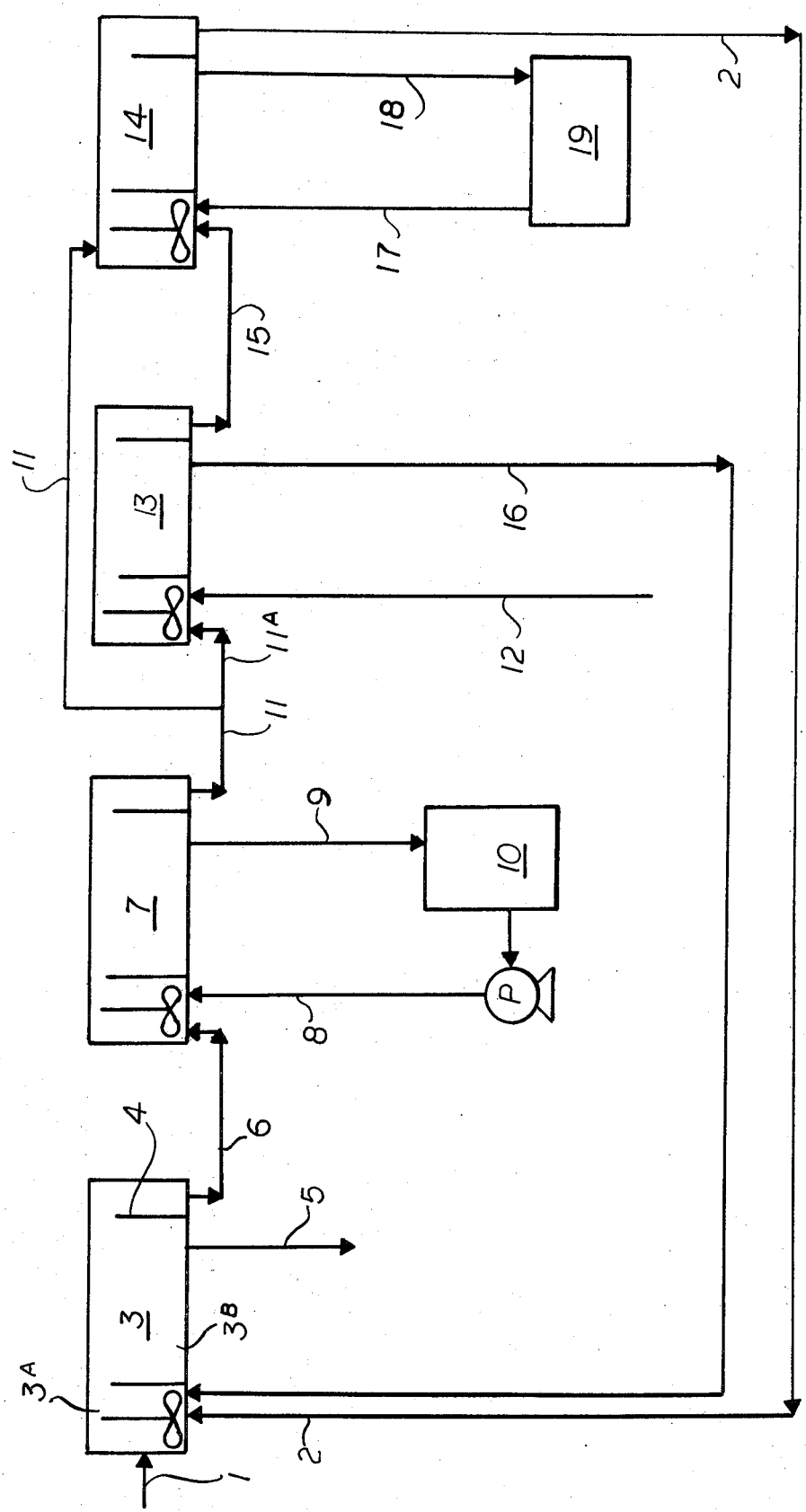

REDUCTION OF NICKEL CONTAMINATION BY ZINC IN α-HYDROXY OXIME EXTRACT

The present invention relates to a process for the separation of nickel values from aqueous solutions containing both nickel and zinc values.

It is known that nickel values can be extracted from aqueous solutions utilizing as extractants certain α-hydroxy oximes. Thus, for example, U.S. Pat. No. 3,276,863 which issued Oct. 4, 1966 to Drobnick et al. relates to a process for the separation of nickel values from aqueous solutions using a water-immiscible organic phase containing certain α-hydroxy oximes. This patent also discloses that the nickel values can be stripped from the loaded organic phase by employing an aqueous solution of a strong acid, with the nickel values then being recoverable from the aqueous stripping solution by electrowinning (electrolysis). In practice, quite often feed solutions contain, in addition to nickel, zinc which is also extracted by the α-hydroxy oximes. Zinc is difficult to separate from nickel by chemical means and when present in appreciable amounts seriously interferes with electrowinning of nickel. The electrolytic separation of zinc from nickel is also extremely hard to achieve.

It is the principal object of this invention to effectively reduce contamination of nickel by zinc when nickel is extracted with α-hydroxy oxime extractants.

In accordance with a basic embodiment of this invention, an α-hydroxy oxime containing both nickel and zinc values is contacted with a source of nickel ions to saturate substantially or "overload" the oxime with nickel and to displace zinc therefrom.

According to a further optional embodiment of the invention, the α-hydroxy oxime material, after being saturated or overloaded with nickel ions, is washed with a weakly acidic solution to remove additional amounts of zinc.

The α-hydroxy oximes with which this invention is concerned and their preparation are described in U.S. Pat. No. 3,224,873 to Ronald R. Swanson which issued Dec. 21, 1965. As described therein, the α-hydroxy oxime extractants have the following general formula:

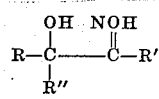

where R, R' and R'' may be an organic hydrocarbon radical, such as aliphatic and alkaryl radicals. R'' may also be hydrogen. The preferred extractants are those wherein R and R' are the same and are unsaturated hydrocarbon or branched chain alkyl groups of from six to 20 carbon atoms, and R'' is hydrogen or is similar to R or R'.

The present invention finds application in reducing zinc contamination of α-hydroxy oximes which are used to extract nickel from aqueous solutions containing both metal values. Thus, the feed solution can be a solution obtained from leaching an ore which contains both nickel and zinc. Nickel is preferably extracted from aqueous solutions by the α-hydroxy oximes under alkaline conditions. Accordingly, the nickel-containing feed solution is either basic or made alkaline by addition of a base, such as ammonia, prior to extraction with the α-hydroxy oximes. Since nickel will precipitate as nickel hydroxide at pH's above about 6.5, and inasmuch as the preferred pH's for extraction are 8 or above, a complexing agent is utilized to hold the nickel in solution. The preferred complexing agent is ammonia which acts both as a base for pH adjustment and as a complexing agent for nickel. The α-hydroxy oxime extractants are employed preferably in the form of a solution in an organic solvent of aliphatic or aromatic hydrocarbons such as kerosene, benzene, toluene, Napoleum 470 and the like. The amount of the α-hydroxy oxime extractant dissolved in the organic solvent can vary widely and is generally about 2 to 30 percent by volume. The extraction is carried out at normal ambient temperatures and at an alkaline pH, preferably above 8. The quantity of α-hydroxy oxime extractant to employ for the extraction depends upon the concentration of nickel in the feed solution and sufficient of the extractant is employed to achieve desired extraction of nickel.

The α-hydroxy oxime extractant which is loaded or partially loaded with nickel and zinc is then contacted with a source of nickel ions to displace the zinc from the extractant. This source of nickel ions contains nickel in excess of the remaining extracting capacity of the extractant, or an "overload" in the terminology of this description. It is an important feature of this invention that the excess can be recycled and need not be lost to the raffinate. The so-contacted α-hydroxy oxime extractant can then be stripped using suitable stripping agents such as aqueous solutions of inorganic acids, e.g. sulfuric, nitric or hydrochloric. If desired, the α-hydroxy oxime extractant, prior to the stripping operation, can be washed with a slightly acidic solution so as to remove the zinc contaminant in addition to that removed previously by the "overloading" treatment. The stripping solution can then be subjected to known procedures, such as crystallization or electrowinning procedures, to recover substantially pure nickel.

The present invention will now be described in further detail in conjunction with the drawing which is a schematic flow diagram. Thus, an aqueous solution containing nickel and zinc which, for example, can be an aqueous solution resulting from the leaching of an ore, flows through line 1 into the primary extractor 3 which may comprise any suitable tank equipped with agitating and mixing means so as to obtain intimate contact between the feed solution and the α-hydroxy oxime extractant. The extractor 3 can suitably be conventional mixer-settler equipment provided with an appropriate weir arrangement to accomplish separation of an aqueous phase and an organic phase. Prior to introduction into extractor 3 the feed solution can be made basic, preferably with ammonia, if it is not already so.

The α-hydroxy oxime extractant, preferably in an organic solvent, is introduced into extractor 3 via line 2. The feed solution (line 1) and the α-hydroxy oxime extractant (line 2) are delivered to extractor 3 at such rates to provide sufficient extracting capacity for the amount of nickel and zinc metal values present in feed solution 1. The amount of extractant to be supplied through line 2 can be readily and routinely determined. After intimate contact in the mixing area 3A of the extractor, the mixed aqueous and organic phases are permitted to separate by virtue of their immiscibility in the settler area 3B and are withdrawn on opposite sides of weir 4. The aqueous phase or raffinate, relatively barren of nickel value, is withdrawn through line 5 and can be processed for recovery of ammonia or recycled to the ore leaching operation, for example. The metals-containing organic phase is sent via line 6 to "overloading" tank 7 which conveniently can be a mixer-settler tank where it is contacted with a nickel-bearing liquid stream which is introduced through line 8. The nickel-bearing stream which is introduced through line 8 may, if desired, be from the same source as the original feed solution. Stream 8 is fed to mixer-settler 7 at a rate to provide nickel ions in excess of the remaining extraction capacity of the α-hydroxy oxime in tank 7. Since all of the nickel ions present in stream 8 cannot be extracted (an excess of nickel ions being desired) the aqueous phase, after phase separation, is withdrawn through line 9 and sent to storage tank 10. The minimum excess of nickel ions leaving overload stage 7 is preferably in the range of 2–3 grams/liter but can vary widely above and below this range depending on the system and degree of effectiveness desired in the overloading process.

The organic extractant phase, now substantially saturated or "overloaded" with nickel, leaves mixer-settler 7 via line 11 and can be sent directly to stripper 14. Optionally, if desired, this organic phase can be directed through line 11a into washer 13. A slightly acidic aqueous wash solution containing, for example, sufficient electrolytes (ammonium sulfate, sodium chloride, etc.) to cause adequate phase separation, is introduced into washer 13 via line 12 and is removed therefrom via line 16, and optionally may be directed back to extraction stage 3. The pH of the wash solution can vary widely, but preferably is in the range of pH 3.5 to 5.5. Washed organic is sent via line 15 to stripper 14.

In stripper 14 the organic extractant phase is contacted with an aqueous nickel stripping solution. A variety of stripping agents can be used, although it is preferred to use aqueous solutions of inorganic acids and salts such as the electrolyte employed in a subsequent electro-winning operation. The stripping agent is introduced into stripper 14 via line 17. When the stripping agent comprises a spent electrolyte from an electrowinning operation or a mother liquor from a subsequent crystallization recovery procedure it can, if necessary, be fortified with acid prior to introduction into stripper 14. The volume phase ratio of the aqueous stripping solution to the organic phase can be varied over wide limits which are well known to those skilled in the art. The aqueous stripping solution and the organic phase are separated by virtue of their immiscibility and the aqueous stripping solution loaded with nickel is sent via line 18 to nickel recovery at 19. Nickel can be recovered at 19 by conventional procedures such as crystallization or electrowinning. The stripped organic phase from stripper 14 is recycled via line 2 to the primary extractor stage 3 for reuse as extractant.

As is seen from the described process, the α-hydroxy oxime extractant becomes partially loaded with nickel and some zinc for which it has lesser affinity in extractor stage 3. In stage 7 it is exposed to nickel ions which displace zinc ions from the extractant. When the nickel ion concentration in storage tank 10 becomes depleted or reduced to a low level through continuous recycling through "overload" stage 7 it can be fed to the extraction stage 3 as feed for removal of nickel values therefrom while tank 10 is replenished with a source of nickel. It is to be appreciated that the "overload" nickel ion source from tank 10 may, if desired, be the same as feed stream 1 and can contain the same impurities.

The process of this invention is not limited by the particular type of equipment employed. Thus, while mixer-settler units have been referred to in the above description, pulsed columns, centrifugal contactors and similar equipment known to those skilled in the art can be used. Moreover, the number of contacting stages for the steps of extraction, overloading, washing and stripping of nickel ions can be varied to accomplish the desired operations, and one or more stages may be necessary, depending upon the zinc content of the feed solution.

A summary of a typical operation of the process of the invention is as follows:

To extract nickel from a stream containing zinc as a primary impurity a solution of approximately 15 percent of α-hydroxy oxime organic extractant (LIX64N developed by General Mills, Inc.) in a hydrocarbon solvent was employed. The system consisted of conventional mixer-settler stages utilizing two primary extraction stages (3), one overload stage (7), one acidic wash stage (13) and two strip stages (14). The organic extractant was stripped with an aqueous nickel sulfate electrolyte which was continuously recycled from nickel electrowinning cells. Ammonia was entrained in the organic liquid extractant and the wash stage was used to prevent crystallization of relatively insoluble nickel ammonium sulfate in the strip stages and electrowinning operation. The acidic wash also removed much of the zinc left on the extractant after the overload stage.

| FLOW | With Overload and Selective Strip | | Without Overload and Selective Strip | |
|---|---|---|---|---|
| | Zn, g/l | Ni, g/l | Zn, g/l | Ni, g/l |
| Stripped Organic Extractant (line 2) | 0.00008 | 0.28 | 0.00008 | 0.28 |
| Loaded Organic Extractant (line 6) | 0.00088 | 2.90 | 0.00088 | 2.90 |
| Overloaded Organic Extractant (line 11) | 0.00036 | 3.35 | | |
| Washed Organic Extractant (line 15) | 0.00013 | 3.15 | | |
| Raffinate (line 5) | 0.033 | 0.010 | | 0.010 |
| Feed (line 1) & Overload Sol'n (line 8) | 0.033 | 5.0 | | 5.0 |
| Wt. % Zn in Ni | | 0.0017 | | 0.0285 |

From the above data the advantages of the present process are readily seen. As can be seen, without the employment of the "overload" and wash stages a relatively large amount of zinc was transferred to the electrolyte. However, by employing the present invention the zinc transfer was reduced to less than current ASTM specifications for electrolytic nickel which is 0.002 weight percent zinc in nickel or less.

Those modifications and equivalents which fall within the spirit of the invention are to be considered a part thereof.

What is claimed is:

1. A process which comprises contacting an aqueous stream containing nickel and zinc with an $\alpha$-hydroxy oxime to extract nickel and zinc from said stream, then contacting said extractant containing both nickel and zinc with an aqueous solution containing an excess of nickel ions to displace zinc therefrom, and then stripping nickel from said extractant.

2. The process of claim 1 wherein after contacting the said extractant with an excess of nickel ions the extractant prior to the stripping operation is washed with an acidic wash solution.

3. A process according to claim 1 wherein the excess of nickel ions is recycled in a closed circuit to prevent loss of the excess of nickel ions.

* * * * *